US011447032B2

(12) United States Patent
Oshima et al.

(10) Patent No.: US 11,447,032 B2
(45) Date of Patent: Sep. 20, 2022

(54) POWER RECEPTION/BILLING BETWEEN MULTIPLE PORTABLE POWER SUPPLY DEVICES

(71) Applicant: HONDA MOTOR CO., LTD., Tokyo (JP)

(72) Inventors: Ryo Oshima, Wako (JP); Sho Takada, Wako (JP); Nobuyuki Sasaki, Wako (JP); Yoshihiro Matsunaga, Wako (JP); Mitsuhiro Ito, Wako (JP); Mio Oshima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 226 days.

(21) Appl. No.: 16/928,375

(22) Filed: Jul. 14, 2020

(65) Prior Publication Data
US 2020/0339004 A1     Oct. 29, 2020

Related U.S. Application Data

(63) Continuation of application No. PCT/JP2018/035856, filed on Sep. 27, 2018.

(30) Foreign Application Priority Data

Feb. 19, 2018   (JP) .............................. JP2018-027215

(51) Int. Cl.
*B60L 53/66*     (2019.01)
*B60L 53/30*     (2019.01)
(Continued)

(52) U.S. Cl.
CPC ........... *B60L 53/665* (2019.02); *B60L 53/305* (2019.02); *G06Q 20/145* (2013.01); *G06Q 50/06* (2013.01); *G07F 15/005* (2013.01)

(58) Field of Classification Search
CPC ... B60L 53/665; B60L 53/305; G06Q 20/145; G06Q 50/06; G06Q 20/065;
(Continued)

(56) References Cited

U.S. PATENT DOCUMENTS 9,496,736 B1* 11/2016 Johansson ............. H02J 7/0047
9,941,723 B2*  4/2018 Albsmeier ............ H01M 10/44
(Continued)

FOREIGN PATENT DOCUMENTS

JP     2002-359676 A    12/2002
JP     2011-22631 A      2/2011
(Continued)

OTHER PUBLICATIONS

International Search Report dated Dec. 18, 2018, issued in counterpart International Application No. PCT/JP2018/035856. (2 pages).
(Continued)

*Primary Examiner* — Nha T Nguyen
(74) *Attorney, Agent, or Firm* — WHDA, LLP

(57) ABSTRACT

A server acquires a reception amount which is an amount of power that a power supply device received from an engine-driven type generator, converts the reception amount into a virtual currency, transmits, to the power supply device, a money transfer instruction in order to instruct a money transfer, to the engine-driven type generator, of a virtual currency that the conversion unit converted the reception amount into. The power supply device generates a money transfer request in order to, in accordance with the money transfer instruction, performs a money transfer of virtual currency to a virtual currency wallet associated with the engine-driven type generator a virtual currency wallet associated with the server, and transmits the money transfer request to a virtual currency network.

7 Claims, 13 Drawing Sheets

(51) Int. Cl.
*G06Q 20/14* (2012.01)
*G06Q 50/06* (2012.01)
*G07F 15/00* (2006.01)

(58) Field of Classification Search
CPC .. G06Q 20/102; G06Q 20/367; G07F 15/005;
Y02T 10/70; Y02T 10/7072; Y02T 90/12;
Y02T 90/16; Y02T 90/167; Y02T 90/169;
Y04S 30/14; Y04S 50/12
See application file for complete search history.

(56) References Cited

U.S. PATENT DOCUMENTS

| | | | |
|---|---|---|---|
| 11,308,461 B2* | 4/2022 | Haldenby | G06Q 50/18 |
| 2011/0010248 A1 | 1/2011 | Nagasaka et al. | |
| 2015/0123607 A1 | 5/2015 | Fujita et al. | |
| 2016/0096493 A1 | 4/2016 | Suzuki et al. | |
| 2016/0161318 A1* | 6/2016 | Pruzina | G01F 9/008 340/870.07 |
| 2016/0284033 A1* | 9/2016 | Winand | H02S 99/00 |
| 2018/0117446 A1* | 5/2018 | Tran | A42B 3/30 |

FOREIGN PATENT DOCUMENTS

| | | |
|---|---|---|
| JP | 2013-21798 A | 1/2013 |
| JP | 2016-77058 A | 5/2016 |
| JP | 2017-74893 A | 4/2017 |
| JP | 2017-211947 A | 11/2017 |
| WO | 2014/010295 A1 | 1/2014 |

OTHER PUBLICATIONS

Miyazaki et al., "10 years of open account system", Technical report of Unisys Technology Review, Aug. 31, 2017, vol. 37, No. 2, pp. 69-82, ISSN: 0914-9996. with English Abstract; Cited in ISR. (16 pages).

* cited by examiner

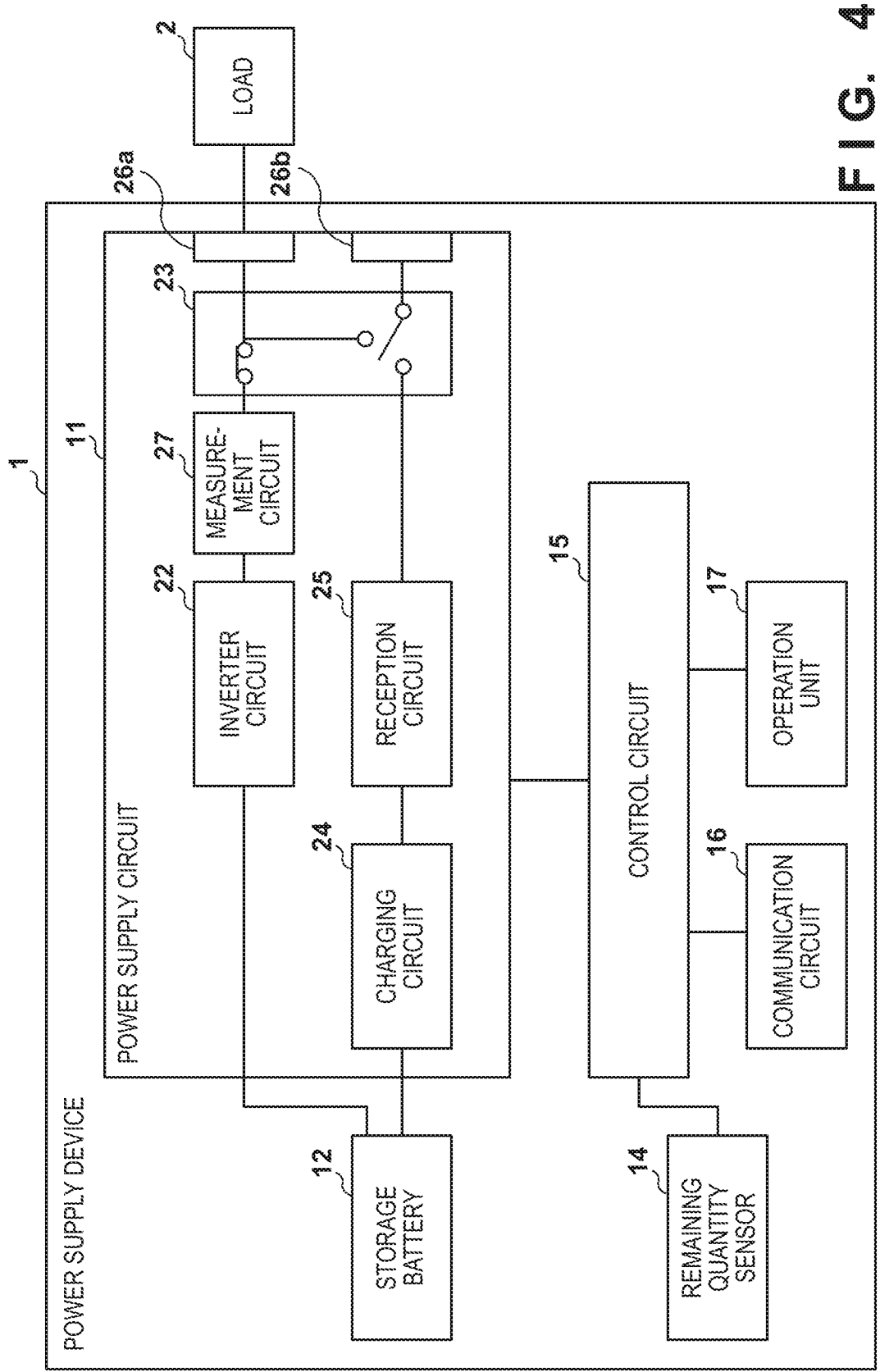
F I G. 4

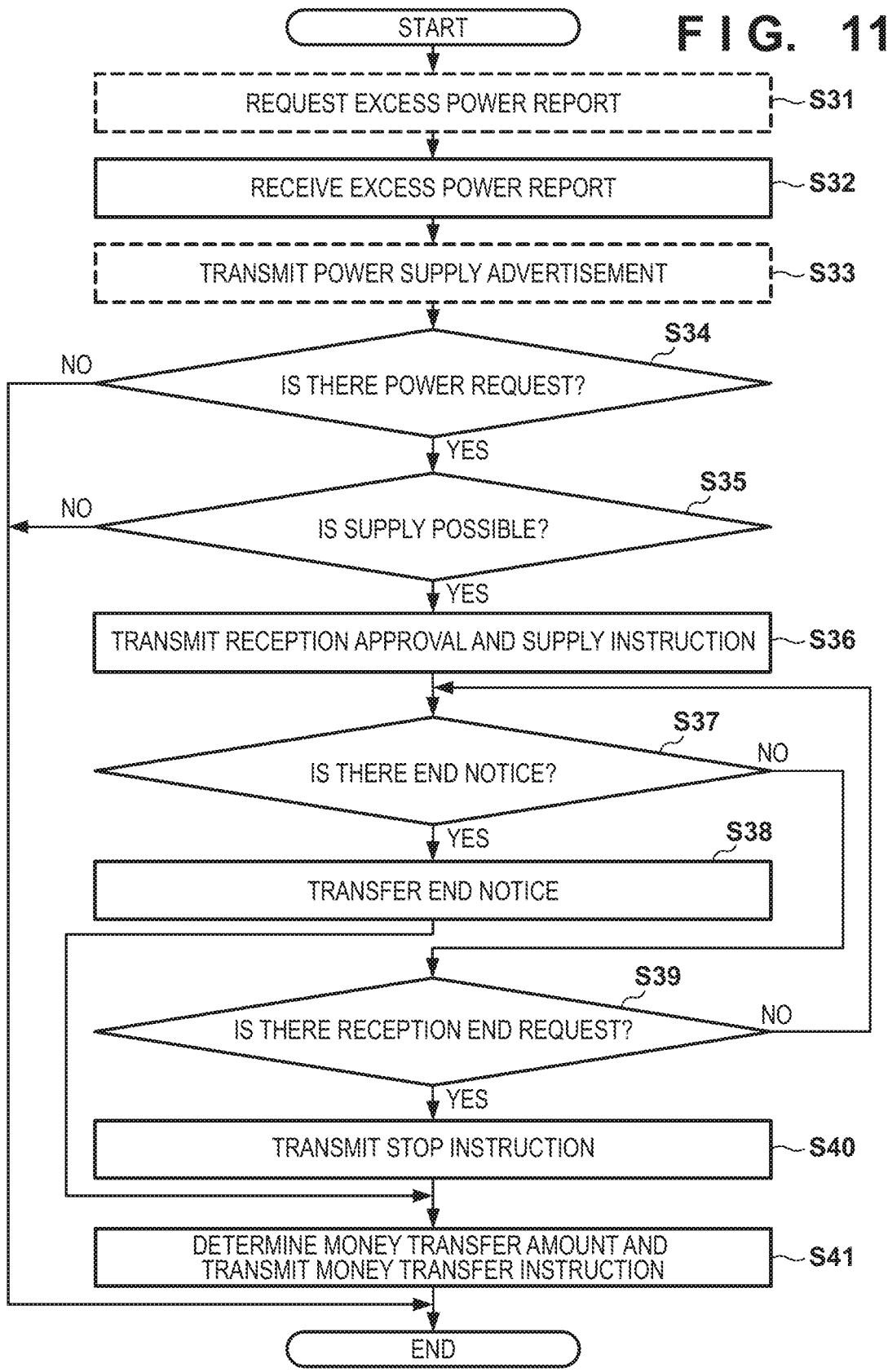
F I G. 11

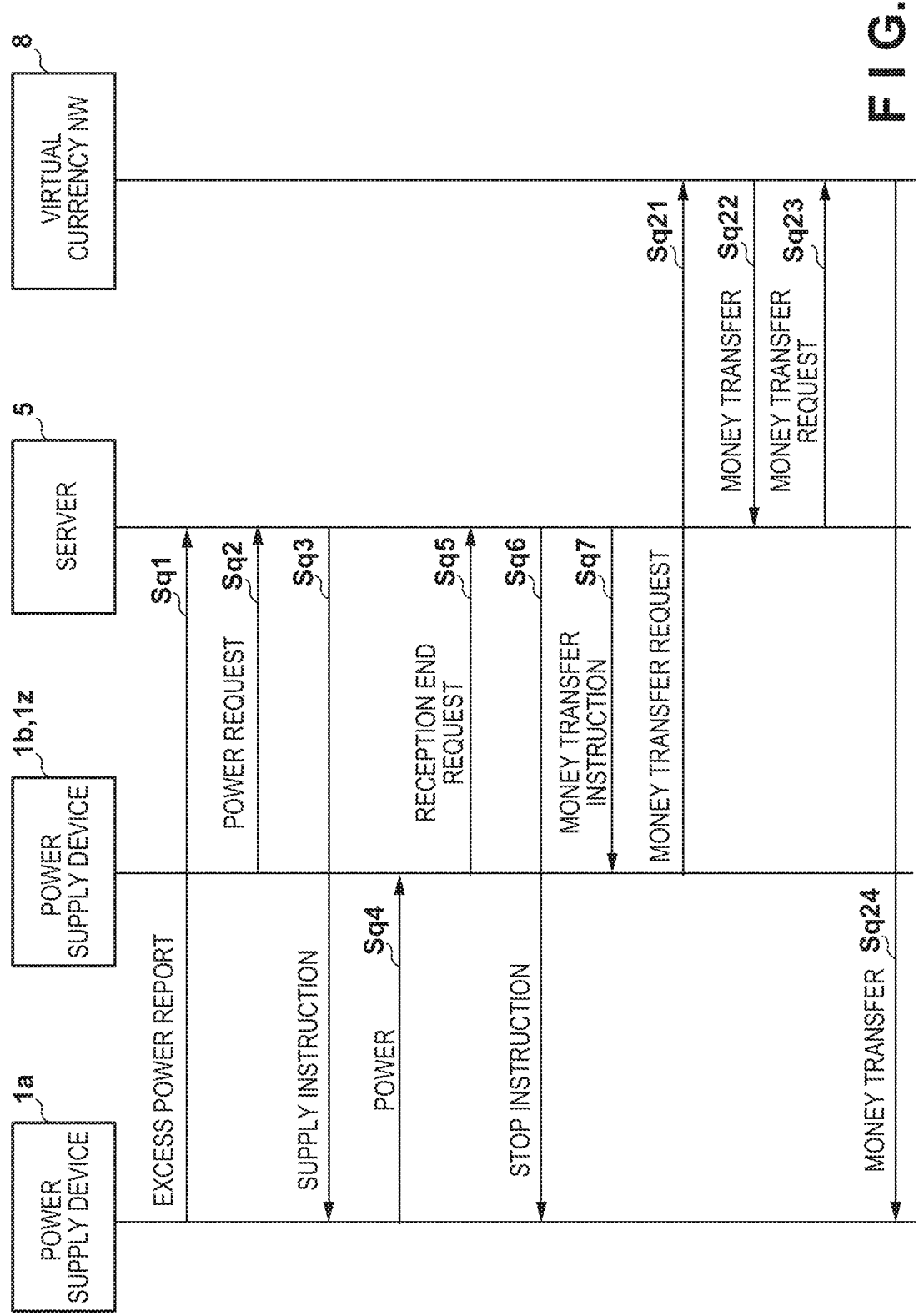
F I G. 12

POWER RECEPTION/BILLING BETWEEN MULTIPLE PORTABLE POWER SUPPLY DEVICES

CROSS-REFERENCE TO RELATED APPLICATION(S)

This application is a continuation of International Patent Application No. PCT/JP2018/035856 filed on Sep. 27, 2018, which claims priority to and the benefit of Japanese Patent Application No. 2018-027215 filed on Feb. 19, 2018, the entire disclosures of which are incorporated herein by reference.

BACKGROUND OF THE INVENTION

Field of the Invention

The present invention relates to power reception/billing between multiple portable power supply devices.

Description of the Related Art

In a commercial AC power supply network, electric power generated by a large-scale power plant is transmitted to each household or business place through a transmission network. PTL1 (Japanese Patent Laid-Open No. 2013-21798) proposed providing a power management system for managing a means for distributing excess power in a situation where it is necessary to cope with excess power due to an increase in power generation means on the side of the consumer such as in the case of adopting large-volume distributed power supply, and incentives. PTL2 (Japanese Patent Laid-Open No. 2017-211947) proposed a power management device, a power system, a consumer device, a power management method, and a power management program capable of effectively utilizing excess power to improve an economical effect of power saving.

PTL 1 and PTL2 both relate to a commercial AC power supply network, but it is thought that power networks independent from the commercial AC power supply network will be set up in campgrounds and the like. Camping enthusiasts bring engine-driven type portable generators to the campground and use electronic appliances there. When an engine runs out of fuel, a portable generator will be unable to generate electricity, and camping enthusiasts will be unable to use appliances. Because a large number of camping enthusiasts gather at the campground, one camping enthusiast's portable generator may not be able to generate electricity, while another camping enthusiast's portable generator may be able to generate electricity. In addition, another camping enthusiast's portable generator may wish to supply power to their own loads while still supplying excess power to another camping enthusiast. In addition, if a camping enthusiast who has provided extra power can receive compensation, the camping enthusiast will be motivated to purchase portable generators and portable storage batteries. Therefore, the present invention provides a virtual currency to a portable power supply device that has supplied excess power.

SUMMARY OF THE INVENTION

The present invention provides a power supply system comprising the following elements. A portable first power supply device and second power supply device supply power to a load, respectively. The portable first power supply device is a portable engine-driven type generator. A server may comprise the following elements. An acquisition unit acquires a reception amount which is an amount of power that the second power supply device received from the engine-driven type generator. A conversion unit converts the reception amount into a virtual currency. A money transfer instruction unit transmits, to the second power supply device, a money transfer instruction in order to instruct a money transfer, to the engine-driven type generator, of a virtual currency that the conversion unit converted the reception amount into. The second power supply device may comprise the following elements. A money transfer request unit generates a money transfer request in order to, in accordance with the money transfer instruction, performs a money transfer of virtual currency to a virtual currency wallet associated with the engine-driven type generator a virtual currency wallet associated with the server, and transmits the money transfer request to a virtual currency network.

BRIEF DESCRIPTION OF THE DRAWINGS

FIG. 4 is a view for illustrating a power supply device.
FIG. 11 is a flowchart for illustrating a power supply method.
FIG. 12 is a sequence diagram illustrating a power supply method.

DESCRIPTION OF THE EMBODIMENTS

Figure 1:
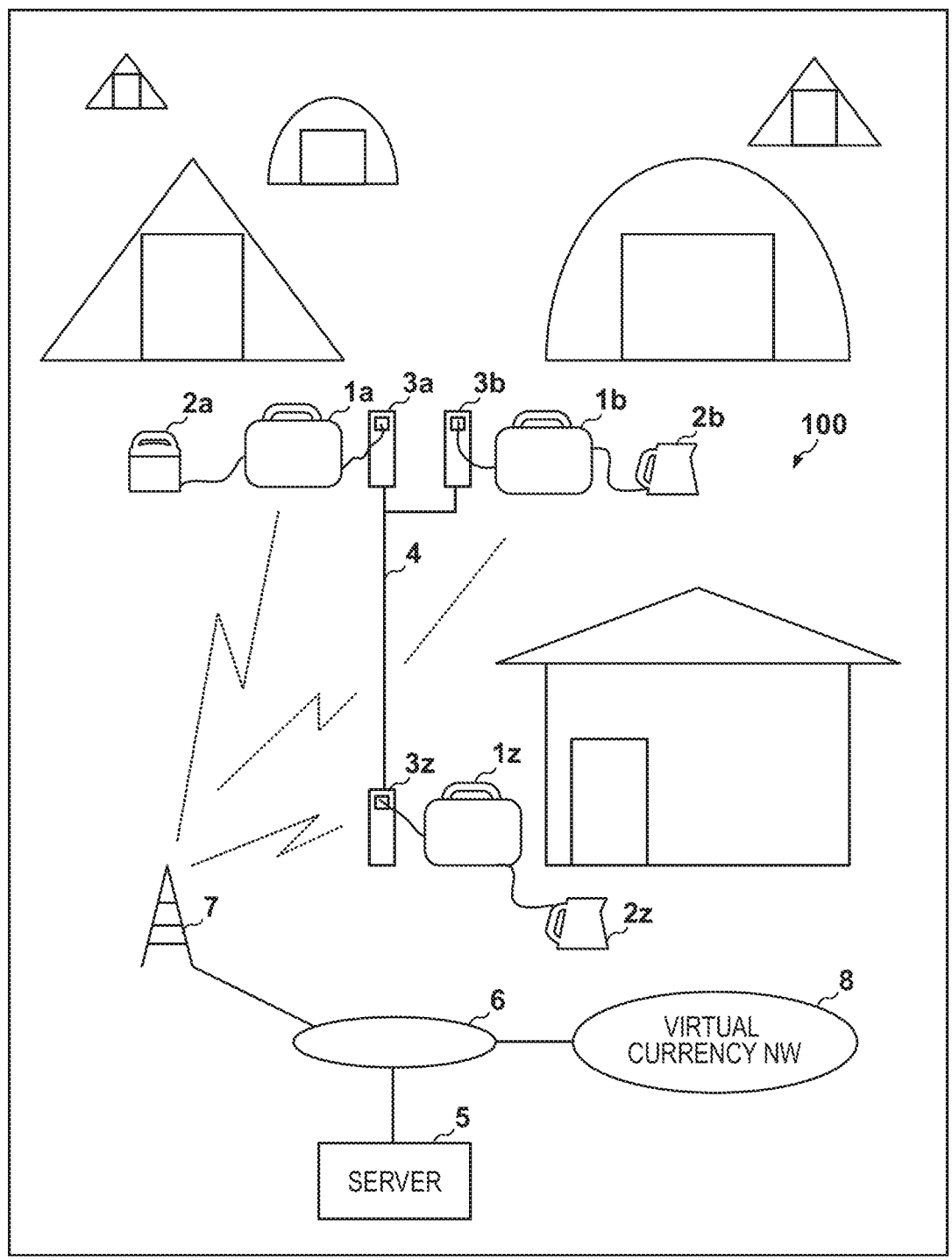
FIG. 1 is a view illustrating a power supply system.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

<Power Supply System>

FIG. 1 illustrates a power supply system 100 installed at a campground. A lowercase alphabet letter applied to the end of the reference numeral is to distinguish between identical or similar devices. Such an alphabet letter is omitted when a matter common to a plurality of devices is described. At the campground, multiple camping enthusiasts (users) set up tents or stay in bungalows and the like. The first user has a power supply device 1a which is a portable generator. The power supply device 1a supplies power that is being generated or stored to a load 2a. The second user has a power supply device 1*b* which is a portable generator. The power supply device 1*b* supplies power that is being generated or stored to a load 2*b*. A power line 4 is stretched around the campground. A plurality of connection terminals 3*a*, 3*b*, 3*c* are connected to the power line 4. The connection terminals 3*a* and 3*b* which are for connecting the power line 4 to a tentsite are provided. The power supply device 1*a* is connected to the connection terminal 3*a*. The power supply device 1*a* supplies excess power to the power line 4 or receives from power supply devices 1*b* and 1*z* their excess power. The power supply device 1*b* is connected to the connection terminal 3*b*. The power supply device 1*b* supplies excess power to the power line 4 or receives from the power supply devices 1*a* and 1*z* their excess power. The connection terminal 3*z* is also provided in a management building in which a manager who manages the campground resides. The power supply device 1*z* supplies excess power to the power line 4 or receives from power supply devices 1*a* and 1*b* their excess power. The power supply devices 1*a*, 1*b*, and 1*z* may be an engine-driven type generator, a storage battery, or an engine-driven type generator with a storage battery. Although three power supply devices 1*a*, 1*b*, and 1*z* are illustrated here for simplicity of illustration, two or more power supply devices 1 are sufficient for the power supply system.

A server 5 is a computer provided at the campground or outside the campground. The server 5 may communicate with the power supply devices 1*a*, 1*b*, and 1*z* via a network 6 and a wireless base station 7. The power line 4 may be utilized for power line conveyed communication. In this instance, the power supply devices 1*a*, 1*b*, and 1*z* may communicate over the power line 4. The management building may also have a router for connecting to the network 6. The power supply devices 1*a*, 1*b*, and 1*z* communicate with the server 5 through the power line 4 and a router. Incidentally, the server 5 is optional. The wireless base station 7 may be a base station for cellular communications or a wireless LAN access point. The server 5 may mediate the supply/reception of power between a plurality of power supply devices, perform a money transfer for compensation, or acquire from a power supply device 1 identification information (e.g., name, type, power consumption) of a load connected to the power supply device 1.

A virtual currency NW 8 is a network (NW) for managing virtual currency. The server 5 calculates a compensation for excess power and applies a virtual currency corresponding to the compensation. For example, the server 5 instructs the power supply device 1*b* that has received the excess power to perform the money transfer of the compensation in virtual currency. The indication includes a money transfer address associated with the power supply device 1*a*. The power supply device 1*b* transmits a request for the money transfer of the virtual currency corresponding to the compensation received from the server 5 to the virtual currency NW 8. The money transfer request also includes a money transfer address associated with the virtual currency wallet of the power supply device 1*a*. The virtual currency NW 8 may be a P2P-type computer network that calculates a blockchain. If the virtual currency NW 8 determines that a money transfer request received from the power supply device 1*b* is valid, the virtual currency NW 8 executes the money transfer of the virtual currency to a virtual currency wallet of the power supply device 1*a*. In this manner, a money transfer may be performed from the virtual currency wallet of the power supply device 1*b* to the virtual currency wallet of the power supply device 1*a*.

Alternatively, a money transfer may be performed from the virtual currency wallet of the server 5 to the virtual currency wallet of the power supply device 1*a*. The server 5 converts the compensation for the excess power provided by the power supply device 1*a* into a virtual currency, and transmits to the virtual currency NW 8 a money transfer instruction for performing a money transfer of the virtual currency to the virtual currency wallet of the power supply device 1*a*. If the virtual currency NW 8 determines that the money transfer request received from the power supply device 1*b* is valid, the virtual currency NW 8 executes the money transfer of the virtual currency to a virtual currency wallet of the power supply device 1*a*.

<Power Supply Device>

Figure 2:
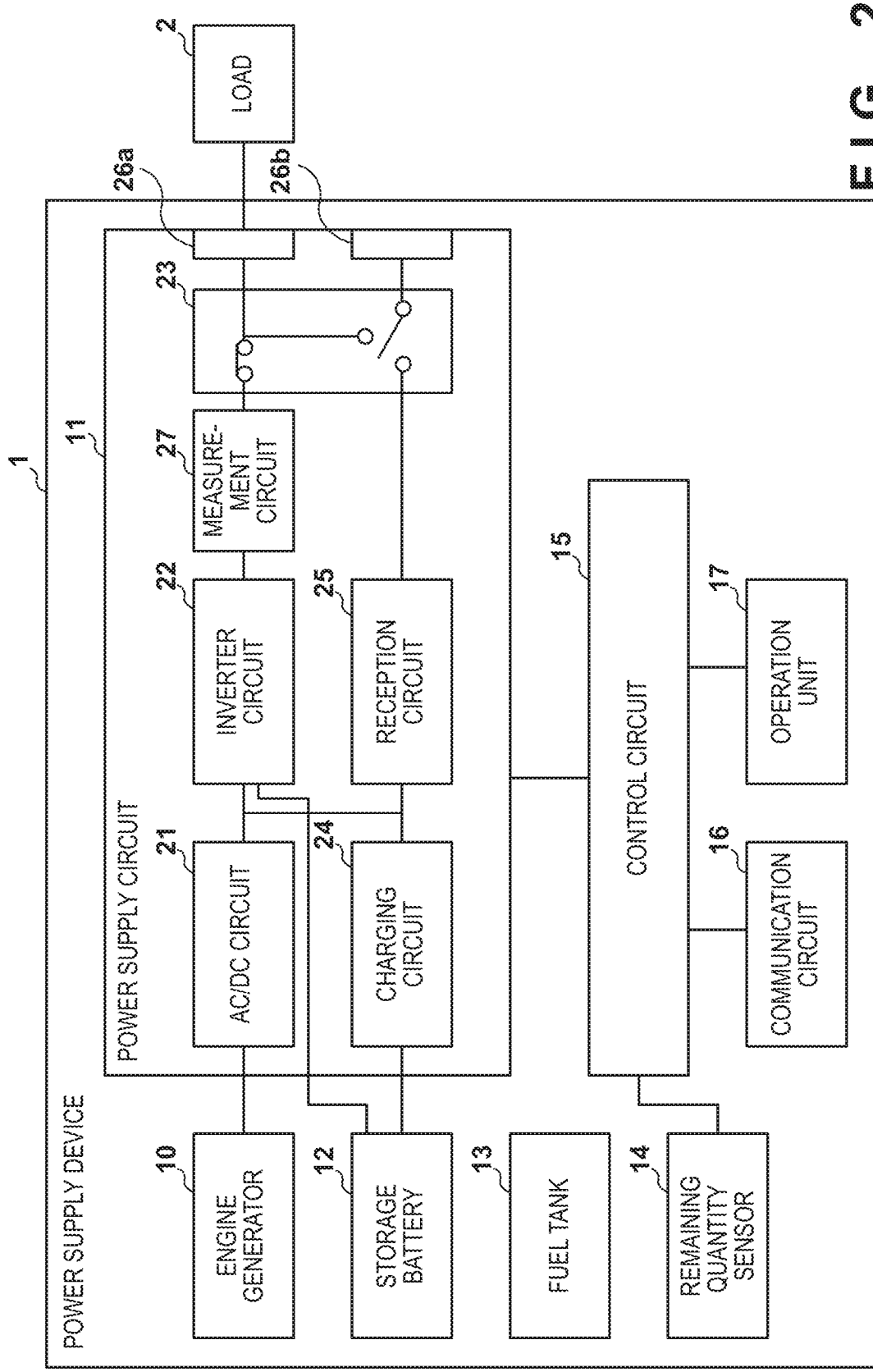
FIG. 2 is a view for illustrating a power supply device.

FIG. 2 is a block diagram illustrating the power supply device 1. An engine generator 10 includes an engine that operates in accordance with fuel supplied from a fuel tank 13 and a generator that is driven by the engine to generate electricity. The fuel may be, for example, gasoline, liquefied petroleum gas, hydrogen, or the like. A power supply circuit 11 is a circuit for converting the voltage generated by the engine generator 10 into a predetermined alternating current or direct current. An AC/DC circuit 21 includes a rectifying smoothing circuit or the like that rectifies and smoothes the alternating current generated by the engine generator 10 to produce a direct current. An inverter circuit 22 is a circuit for converting the direct current outputted from the AC/DC circuit 21 or a storage battery 12 into a stable alternating current of a predetermined frequency. The inverter circuit 22 may convert the direct current output from the storage battery 12 into a stable alternating current of a predetermined frequency. An AC terminal 26*a* is a terminal to which a load 2 is connected. An AC terminal 26*b* is a terminal to which a load 2 is connected or the power line 4 is connected. The AC terminal 26*b* may be a dedicated terminal for connecting the power line 4. A switch circuit 23, in response to a control signal from a control circuit 15, connects the inverter circuit 22 and the AC terminal 26*b*, or connects a reception circuit 25 and the AC terminal 26*b*. For example, when causing the AC terminal 26*b* to function as an AC outlet, the control circuit 15 controls the switch circuit 23, and connects the inverter circuit 22 and the AC terminal 26*b*. When causing the AC terminal 26*b* to function as an AC inlet, the control circuit 15 controls the switch circuit 23 to connect the AC terminal 26*a* and the AC terminal 26*b* (direct connection) or to connect the reception circuit 25 and the AC terminal 26*b* (indirect connection). In the latter case, the alternating current inputted from the AC terminal 26*b* is converted into direct current by the reception circuit 25 and supplied to a charging circuit 24 or the inverter circuit 22. Since a function of the reception circuit 25 and a function of the AC/DC circuit 21 are the same, they may be integrated as one circuit. The charging circuit 24 charges the storage battery 12 using the power inputted from the AC terminal 26*b*. Normally, the charging circuit 24 charges the storage battery 12 using the power outputted from the AC/DC circuit 21. The control circuit 15 is a circuit for controlling the power supply circuit 11, a communication circuit 16, an operation unit 17, or the like. The communication circuit 16 communicates with a smartphone or a PC (personal computer) via wired or wireless communication, and communicates with another power supply device 1 and the server 5. The operation unit 17 includes a display device and an input device. A remaining amount sensor 14 measures the remaining amount of fuel contained in the fuel tank 13, measures the power storage amount of the storage battery 12, and outputs measurement results to the control circuit 15. A measurement circuit 27 is a circuit for measuring the power supplied to the load 2 (power consumption in the load 2), and outputting the measurement result to the control circuit 15. The control circuit 15 obtains the power that can be supplied by the power supply device 1 from the power generated by the engine generator 10 and the power storage amount of the storage battery 12. Further, the control circuit 15 acquires the power consumption of the load 2 using the measurement circuit 27. The control circuit 15 obtains the difference between the suppliable power and the power consumption of the load 2 as excess power. Power consumption of the power supply device 1 itself may also be added to this power consumption. If excess power is present, the control circuit 15 may output a message indicating that there is excess power to the smartphone, another power supply device 1 or the server 5 through the display device or the communication circuit 16 of the operation unit 17. The control circuit 15, upon receiving a receiving request from a smartphone, another power supply device 1, or the server 5 through the input device of the operation unit 17 or the communication circuit 16, starts the supply of power to the power line 4 through the switch circuit 23.

Figure 3:
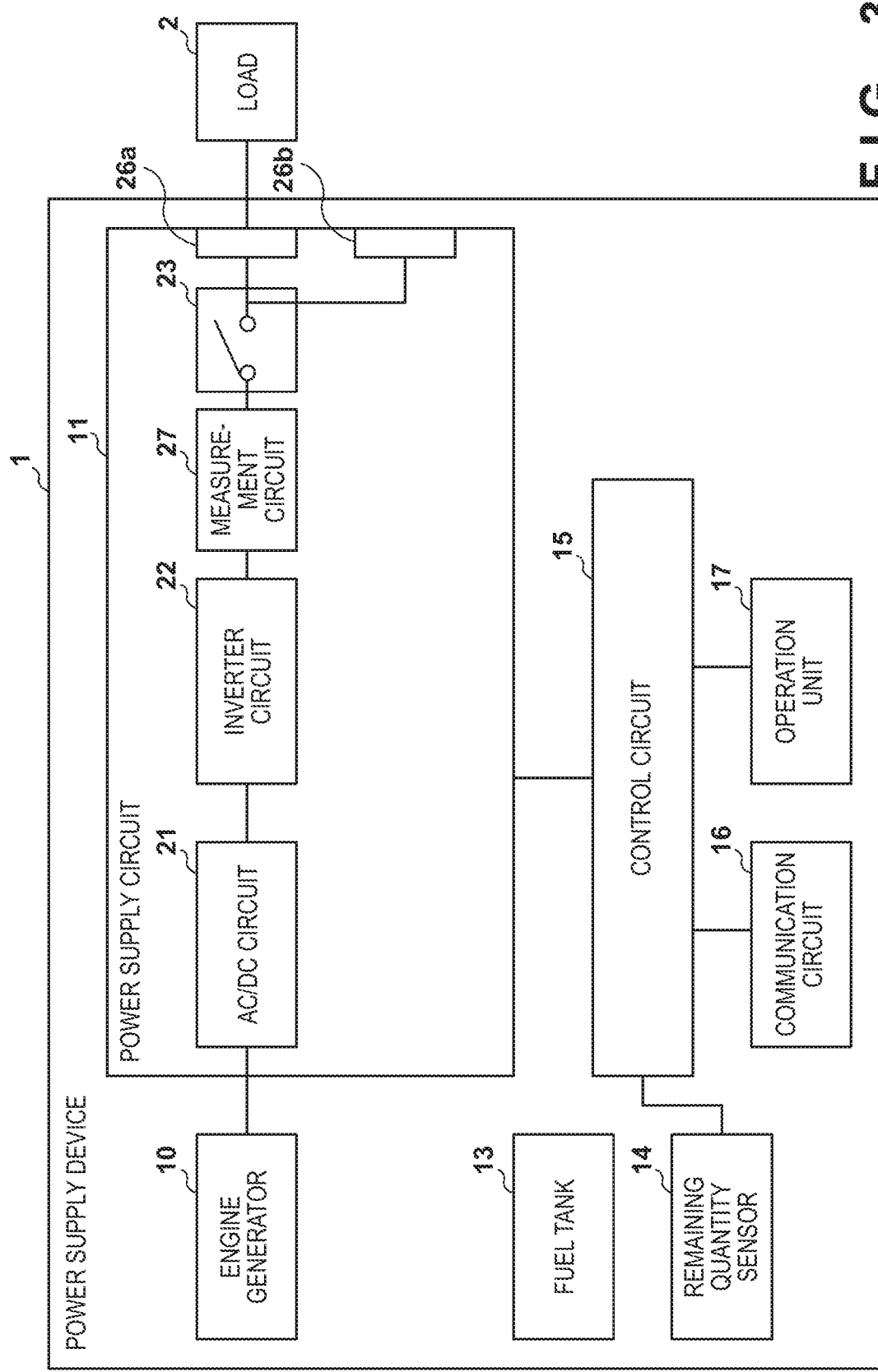
FIG. 3 is a view for illustrating a power supply device.

FIG. 3 is a block diagram illustrating a power supply device 1 without the storage battery 12. Compared to FIG. 2, the circuit associated with the storage battery 12 is omitted in FIG. 3. This type of power supply device 1 can supply power to the load 2 only during periods when the engine generator 10 is in operation. Incidentally, when the power supply device 1 receives a supply of power from another power supply device 1 through the power line 4, the control circuit 15 controls the switch circuit 23 to cut off the inverter circuit 22 and the AC terminals 26a and 26b, the AC terminal 26a and the AC terminal 26b may be connected. In this case, the power line 4 is connected to the AC terminal 26b, and the load 2 is connected to the AC terminal 26a. Power supplied from the power line 4 is supplied to the load 2 through the AC terminal 26b and the AC terminal 26a.

FIG. 4 is a block diagram illustrating a power supply device 1 without the engine generator 10. Compared to FIG. 2, the circuit associated with the engine generator 10 is omitted in FIG. 4. In this case, the storage battery 12 is charged by power supplied from another power supply device 1 via the power line 4 and the AC terminal 26b.

Figure 5:
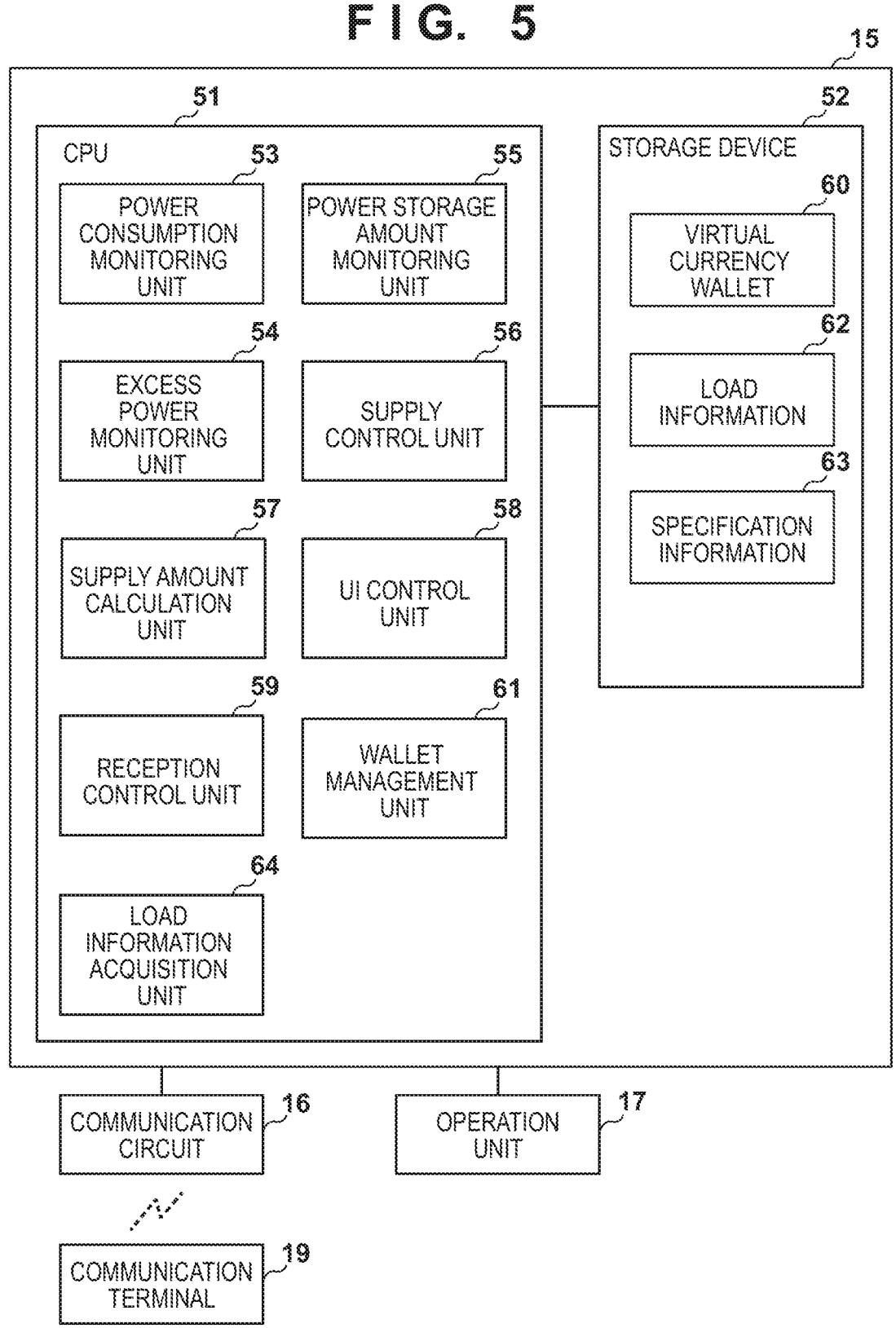
FIG. 5 is a view for describing functions of a control circuit.

FIG. 5 illustrates functions of the control circuit 15 of the power supply device 1. With reference to FIG. 5, the technical ideas derived from the present embodiment will be exemplified. In FIG. 5, CPU 51 executes a control program stored in a storage device 52, thereby realizing a power consumption monitoring unit 53, an excess power monitoring unit 54, a power storage amount monitoring unit 55, a supply control unit 56, a supply amount calculation unit 57, a UI control unit 58, a reception control unit 59, and the like. These are the agents that perform the previously described power supply method. The power consumption monitoring unit 53 monitors the power consumption of the load 2 using the measurement circuit 27. The excess power monitoring unit 54 obtains the excess power based on the power consumption of the load 2, the power generation capacity of the engine generator 10, the power storage amount of the storage battery 12, and the like. The power storage amount monitoring unit 55 monitors the power generation capacity of the engine generator 10, the power storage amount of the storage battery 12, and the like. The supply control unit 56 controls the supply of excess power. The supply control unit 56 transmits an excess power report, an excess power advertisement, and an end notice, and receives a power request or a supply instruction, a deposit report, and the like.

The supply amount calculation unit 57 calculates the amount of power supplied from the power supply device 1 to the power line 4. The reception control unit 59 controls the reception of power from the power line 4. The reception control unit 59 may transmit a power request or a reception end request, or may receive a reception approval, an end notice, or a money transfer report. The UI control unit 58 receives input of information from the operation unit 17, a communication terminal 19 of the smartphone connected to the communication circuit 16, and the like, and outputs information to these. All or some of these functions implemented by the CPU 51 may be implemented by hardware circuitry, such as a field programmable gate array (FPGA) or a digital signal processor (DSP). A virtual currency wallet 60 includes a private key, a public key, and a virtual currency address for the user of the power supply device 1. For example, a wallet management unit 61 transmits the public key and the virtual currency address read from the virtual currency wallet 60 to the server 5. These information may be encrypted using the public key of the server 5. The server 5 encrypts the message to the power supply device 1 using the public key received from the power supply device 1. For example, the server 5 gives the virtual currency to the power supply device 1a in return for the excess power supplied by the power supply device 1a. The server 5 instructs the power supply device 1b that has received the excess power to transmit a money transfer of virtual currency. The money transfer instruction includes a virtual currency address for specifying the virtual currency wallet of the power supply device 1a, and information on the money transfer amount. Upon receiving the money transfer instruction, the wallet management unit 61 of the power supply device 1b generates a money transfer request for making a money transfer of virtual currency according to the money transfer amount to the virtual currency address for specifying the virtual currency wallet of the power supply device 1a, and transmits the money transfer request to the virtual currency NW 8. The virtual currency NW 8 performs a money transfer to the virtual currency wallet of the power supply device 1a in accordance with a money transfer request.

A load information acquisition unit 64 may estimate the load 2 from the voltage and current of the load 2, generate load information 62 indicating the load 2, and store the load information 62 in the storage device 52. The load information acquisition unit 64 may store the load information 62 input from the operation unit 17 or the like in the storage device 52. The load information acquisition unit 64 may transmit specification information 63 indicating a rated output power of the load information acquisition unit 64 or the power supply device 1 to the server 5.

Figure 6:
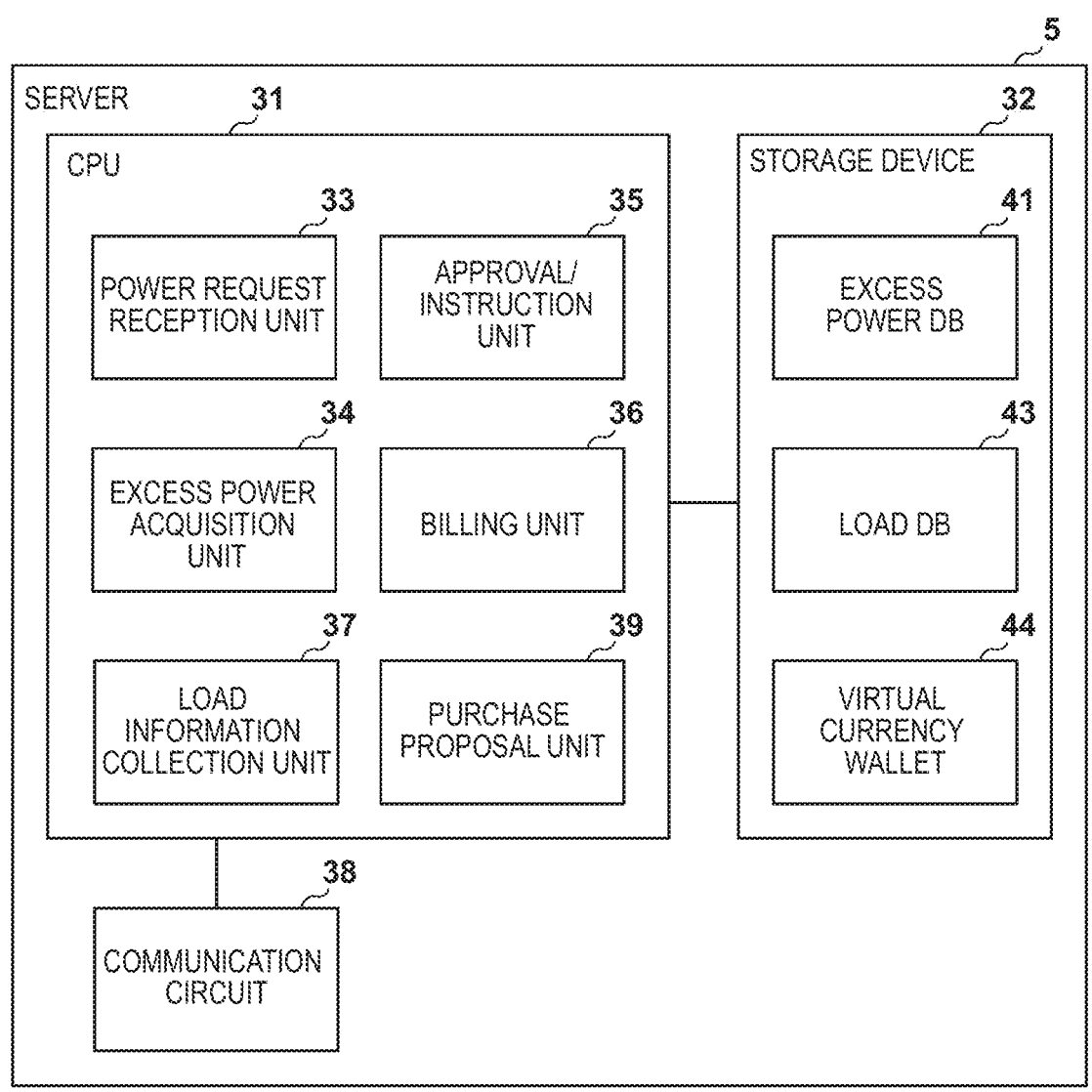
FIG. 6 is a view for describing functions of a server.

FIG. 6 is a diagram for explaining functions of the server 5. A CPU 31 of the server 5 executes a control program stored in a storage device 32, thereby functioning as a power request reception unit 33, an excess power acquisition unit 34, an approval/instruction unit 35, a billing unit 36, and a load information collection unit 37. The storage device 32 includes a RAM or a ROM, and stores an excess power DB 41, a billing DB 42 and a load DB 43, and the like. DB is an abbreviation for database. RAM is an abbreviation for random access memory. ROM is an abbreviation for read only memory. Each function will be described in detail below. A virtual currency wallet 44 is a wallet of a company that operates the server 5 and is optional. The power request reception unit 33 receives a power request from the power supply device 1 via a communication circuit 38. The excess power acquisition unit 34 acquires the excess power report or the power supply advertisement indicating that there is excess power from the power supply device 1 via the communication circuit 38. The excess power report or a power supply advertisement may include information indicating the power that the power supply device 1 can supply through the power line 4. The approval/instruction unit 35 transmits a request approval, a supply instruction, a supply end instruction, and the like to the power request. The billing unit 36 converts a compensation for the excess power supply amount into a virtual currency, and transmits a money transfer instruction to the power supply device 1.

The load information collection unit 37 collects load identification information (load name or category name (e.g., tool, cooking appliance, audio, personal computer), power consumption of the load) indicating the load connected to the power supply device 1 from the power supply device 1, and registers the load identification information in the load DB 43 in association with identification information of the power supply device 1 or identification information of the user. By analyzing the load DB 43, the load information collection unit 37 can recognize what loads 2 are used in the campground. A purchase proposal unit 39, based on the load information collected in the load information collection unit 37, generates a proposal for purchase of other loads that are related, and transmits the proposal to the power supply device 1. The purchase proposal unit 39 may generate a purchase proposal for an operable load receiving the supply of power from the power supply device 1 based on the specification information of the power supply device 1.

<Power Supply Sequence>

Figure 7:
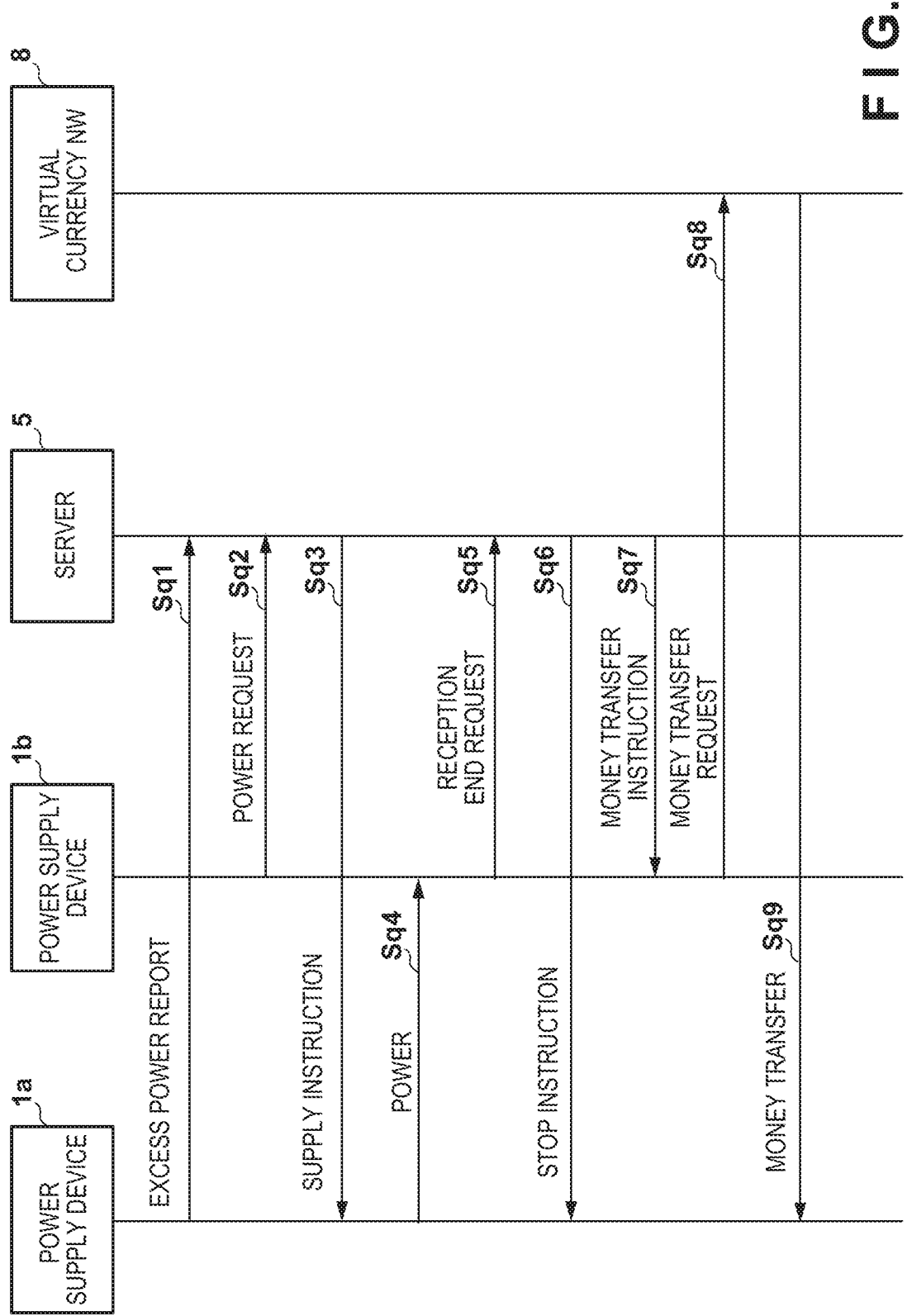
FIG. 7 is a sequence diagram illustrating a power supply method.

FIG. 7 is a sequence diagram for illustrating a power supply method. Here, it is assumed that the power supply device 1*a* supplies power to the power supply device 1*b*.

In Sq1, the power supply device 1*a* obtains the excess power and transmits to the server 5 an excess power report indicating that there is excess power or the excess power value. The server 5 receives the excess power report and recognizes that there is a power supply device 1*a* capable of supplying power.

In Sq2, the power supply device 1*b* transmits to the server 5 a power request (reception request) indicating that it wants to receive power. The server 5 receives the power request and recognizes that there is a power supply device 1*b* wishing to receive power. Note that Sq2 may be executed before Sq1.

In Sq3, the server 5 transmits a power supply instruction to the power supply device 1*a*. It should be noted that the server 5 may transmit a reception approval to the power supply device 1*b*.

In Sq4, the power supply device 1*a* initiates the supply of power to the power line 4 in accordance with the received supply instruction. The power supply device 1*b* receives the power supplied from the power supply device 1*a* through the power line 4 in accordance with the reception approval.

In Sq5, the power supply device 1*b* transmits a stop request to the server 5 when the user instructs to stop reception through the operation unit 17 or the like. The power supply device 1*b* may measure the sum of the received power (total received power amount) and include it in the reception end request and transmit it.

In Sq6, the server 5 transmits a stop instruction for stopping the power supply to the power supply device 1*a* in accordance with the received reception end request. Upon receiving the stop instruction, the power supply device 1*a* stops supplying power to the power line 4. Incidentally, the power supply device 1*a* may measure the total value of the power output to the power line 4 (total supplied power amount), and transmit it to the server 5. If there is one power supply device 1 for supplying power and there is also one power supply device 1 to receive power, the total received power amount and the total supplied power amount will coincide. Incidentally, when the power supply device 1*z* is also to receive power, the total supplied power amount of the power supply device 1*a* is equal to the sum of the total received power amount of the power supply device 1*b* and the total received power amount of the power supply device 1*z*. When the power supply device 1*z* is also to supply power, the sum of the total supplied power amount of the power supply device 1*a* and the total supplied power amount of the power supply device 1*z* is equal to the total received power amount of the power supply device 1*b*.

In Sq7, the server 5 converts the compensation obtained from the total received power amount received from the power supply device 1*b* into virtual currency, and transmits a money transfer instruction for executing the money transfer to the electronic wallet of the power supply device 1*a* to the power supply device 1*b*.

In Sq8, the power supply device 1*b* extracts a virtual currency address and a money transfer amount of the electronic wallet of the power supply device 1*a* from the money transfer instruction received from the server 5, generates a money transfer request for making a money transfer of virtual currency corresponding to the money transfer amount to the virtual currency address, and transmits the request to the virtual currency NW 8.

In Sq9, if the money transfer request is valid, the virtual currency NW 8 performs the money transfer of the virtual currency specified by the money transfer request from the virtual currency wallet of the power supply device 1*b* to the virtual currency wallet of the power supply device 1*a*.

Figure 8:
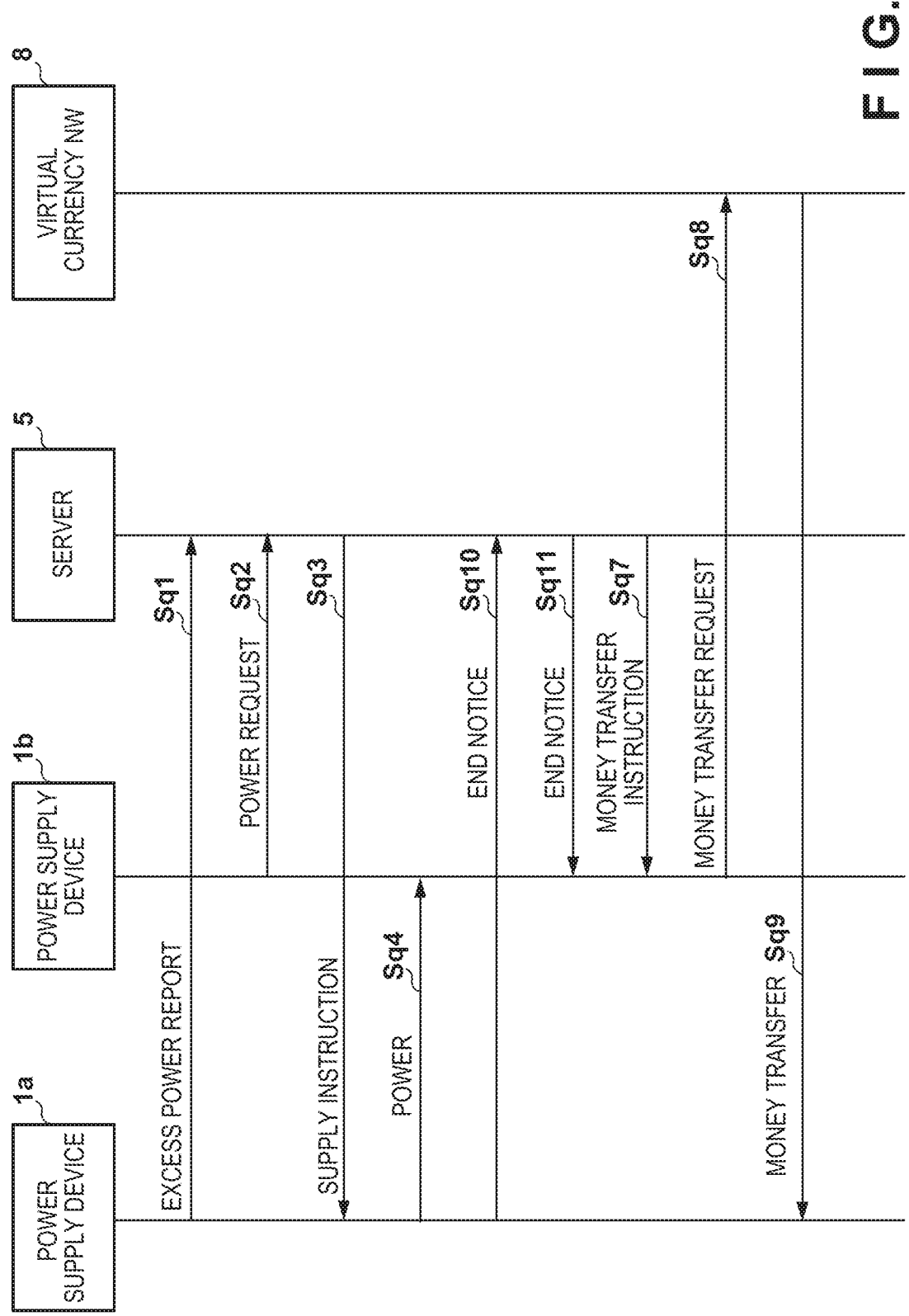
FIG. 8 is a sequence diagram illustrating a power supply method.

FIG. 8 is a sequence diagram for illustrating a power supply method. Here, it is assumed that the power supply device 1*a* supplies power to the power supply device 1*b*. Also, in the power supply device 1*a*, if the power storage amount is insufficient, fuel is insufficient, or the power consumption of the load 2*a* is increased, the power supply device 1*a* can no longer provide enough power. Therefore, the power supply device 1*a* may transmit an end notice to the server 5 to prompt the power supply device 1*b* to stop the load 2*b*. In FIG. 8, parts common to those in FIG. 7 are given the same reference numerals, and the description of FIG. 7 is invoked therefor.

In Sq10, when the power storage amount is insufficient or fuel is insufficient or the power consumption of the load 2*a* increases, the power supply device 1*a* transmits an end notice to give a notice to the server 5 and the power supply device 1*b* to end the supply of power.

When in Sq11 the server 5 receives the end notice from the power supply device 1*a*, the server 5 transmits the end notice to the power supply device 1*b*. Upon receiving the end notice from the server 5, the power supply device 1*b* stops supplying power to the load 2*b* or outputs a message prompting the display device or the like of the operation unit 17 to stop.

<Flowchart>

Figure 9:
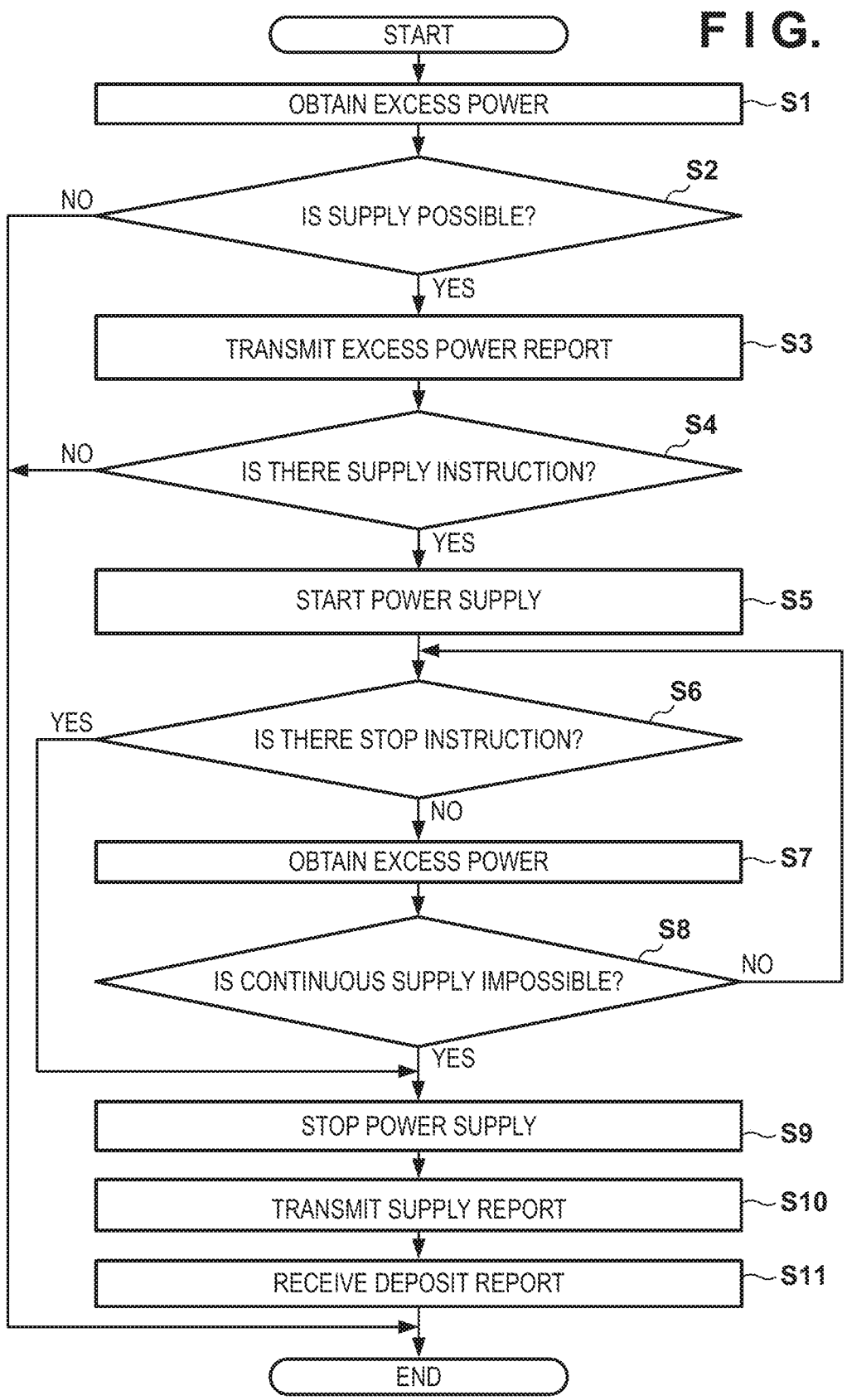
FIG. 9 is a flowchart for illustrating a power supply method.

FIG. 9 is a flowchart illustrating a power supply scheme performed by a power supply device 1*a* that supplies power.

In step S1, the CPU 51 (the excess power monitoring unit 54) obtains the measurement result of the remaining amount sensor 14 (example: power storage amount, power generation amount) and the measurement result of the measurement circuit 27 (power consumption of the load 2*a*) based on the excess power.

In step S2, the CPU 51 (the excess power monitoring unit 54) compares the excess power and the threshold value to determine whether at least a portion of the excess power can be supplied to the other power supply device 1*b*. The threshold value may be, for example, 0 W. Alternatively, the threshold value may be the power consumption of the power supply device 1*a* itself. If power cannot be supplied, the CPU 51 ends the power supply process. On the other hand, if power can be supplied, the CPU 51 proceeds to step S3.

In step S3, the CPU 51 (excess power monitoring unit 54) generates an excess power report (or an excess power advertisement) and transmits it to the server 5 or the like via the communication circuit 16. The excess power report is transmitted to a specific communication device (the server 5 or the power supply device 1), but the excess power advertisement is transmitted to an unspecified communication device.

In step S4, the CPU 51 (the supply control unit 56) determines whether an instruction to supply power (or a request to receive power) has been received from the server 5 or the like via the communication circuit 16. If a supply instruction has not been received, the supply control unit 56 ends the power supply method. If a supply instruction has been received, the CPU 51 proceeds to step S5.

The CPU 51 (the supply control unit 56) in step S5 controls the switch circuit 23 and starts supplying power to the power supply device 1*b* via the power line 4 by connecting the AC terminal 26*b* and the inverter circuit 22.

In step S6, the CPU 51 (the supply control unit 56) determines whether an instruction to stop supplying power has been received from the server 5 or the like via the communication circuit 16. The control circuit 15 proceeds to step S9 upon receiving a stop instruction, and the process proceeds to step S7 if a stop instruction has not been received.

In step S7, the CPU 51 (the excess power monitoring unit 54) obtains the measurement result of the remaining amount sensor 14 (example: power storage amount, power generation amount) and the measurement result of the measurement circuit 27 (power consumption of the load 2*a*) based on the excess power.

In step S8, the CPU 51 (excess power monitoring unit 54) determines whether or not the power can be continuously supplied to the power supply device 1*b* based on whether the excess power is equal to or greater than the power requested from the power supply device 1*b*. When it is determined that the CPU 51 cannot be supplied, the process proceeds to step S9, and when it is determined that the supply is possible, the process returns to step S6.

The CPU 51 (the supply control unit 56) in step S9 controls the switch circuit 23 to stop the supply of power to the power supply device 1*b* through the power line 4.

In step S10, the CPU 51 (the supply amount calculation unit 57) may supply electric power to the power line 4 to obtain an electric power amount, and may transmit a supply report (compensation request) including the electric power amount, the public key, and the virtual currency address to the server 5.

In step S11, the CPU 51 (the wallet management unit 61) receives the deposit report from the virtual currency NW 8, and outputs the deposit report to the display device of the operation unit 17. The deposit report may be output to the display device of the communication terminal 19 through the communication circuit 16.

Figure 10:
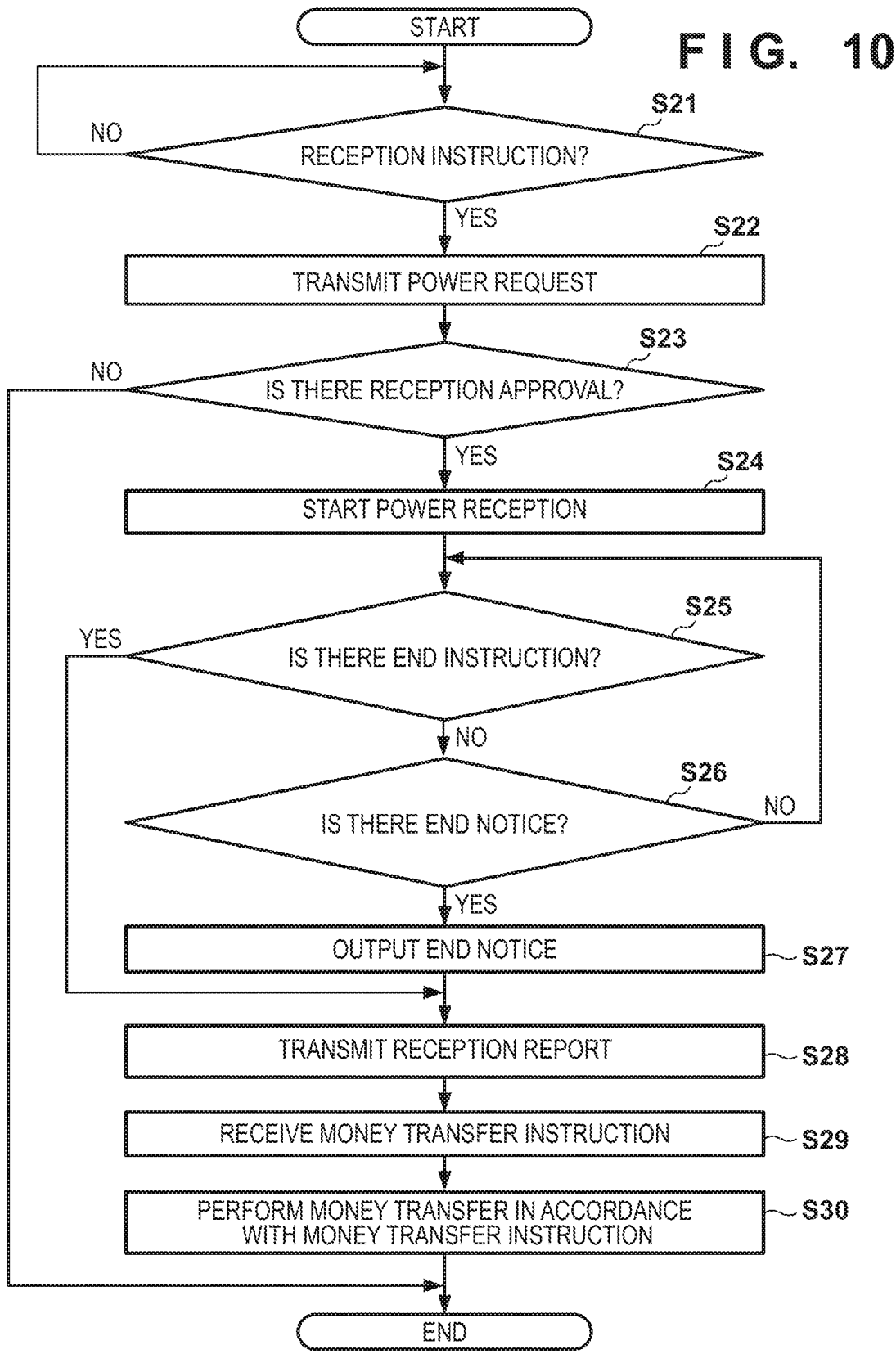
FIG. 10 is a flowchart for illustrating a power supply method.

FIG. 10 is a flowchart illustrating a power supply method performed by a power supply device 1*b* that receives power.

In step S21, the CPU 51 (the reception control unit 59) determines whether an instruction to receive electric power has been inputted from the operation unit 17 or a smartphone connected to the communication circuit 16. When the CPU 51 receives the input of the reception instruction, the CPU 51 proceeds to step S22.

In step S22, the CPU 51 (the reception control unit 59) transmits a power request (reception request) to the server 5 or the like. The power request may include information of the power consumption (rated power consumption) of the load 2*b* measured by the measurement circuit 27 or inputted from the operation unit 17 or the communication circuit 16.

In step S23, the CPU 51 (the reception control unit 59) determines whether a supply approval (reception approval) has been received from the server 5 or the like via the communication circuit 16. If the reception approval cannot be received, the CPU 51 ends the power supply method (power reception method). On the other hand, upon receiving the reception approval, the CPU 51 proceeds to step S24.

The CPU 51 (the reception control unit 59) in step S24 controls the switch circuit 23 to supply to the load 2*b* power supplied from the power supply device 1*a* through the power line 4. The reception control unit 59 may measure the amount of power that was received by using the measurement circuit.

In step S25, the CPU 51 (the reception control unit 59) determines whether a reception end instruction has been inputted from the operation unit 17 or a smartphone or the like connected to the communication circuit 16. When the CPU 51 receives the input of a reception end instruction, the CPU 51 proceeds to step S28. If a reception end instruction has not been inputted, the CPU 51 proceeds to step S26.

In step S26, the CPU 51 (the reception control unit 59) determines whether an end notice has been received from the server 5 or the power supply device 1*a* via the communication circuit 16. Upon receiving the end notice, the CPU 51 proceeds to step S27. If the end notice has not been received, the CPU 51 returns to step S25.

In step S27, the CPU 51 (the UI control unit 58) outputs an end notice to a display device of the operation unit 17 or a smartphone or the like connected to the communication circuit 16.

In step S28, the CPU 51 (the reception control unit 59) may generate a reception report (billing request) including the total amount (reception amount) of the electric power received from the power line 4, its own public key, and the virtual currency address, and transmit it to the server 5.

In step S29, the CPU 51 (the wallet management unit 61) receives the money transfer instruction from the server 5.

In step S30, the CPU 51 (the wallet management unit 61) performs a money transfer to the power supply device 1*a* in accordance with the money transfer instruction. For example, the wallet management unit 61 extracts the virtual currency money transfer amount and the virtual currency address of the power supply device 1*a* from the money transfer instruction, and transmits the transmission supply including the money transfer amount and the virtual currency address to the virtual currency NW 8. When the virtual currency NW 8 completes the money transfer, the wallet management unit 61 receives a withdrawal report from the virtual currency NW 8, and outputs the withdrawal report to the operation unit 17 and the communication terminal 19.

Incidentally, the reception control unit 59 switches the state of the switch circuit 23 from the reception state to the non-reception state. In the non-reception state, the power supply device 1*b* supplies power to the load 2*b* from its own engine generator 10 or storage battery 12.

FIG. 11 is a flowchart for illustrating a power supply method that the server 5 executes.

In step S31, the CPU 31 (the excess power acquisition unit 34) requests the power supply device 1 to transmit the excess power report to the server 5. Note that step S31 may be omitted. The address of the power supply device 1 which can be connected to the power line 4 is stored in advance in the storage device 32, and can be used by the excess power acquisition unit 34.

In step S32, the CPU 31 (excess power acquisition unit 34) receives an excess power report from one or more power supply device 1 via the communication circuit 38. The excess power acquisition unit 34 stores the identification information of the power supply device 1 and the excess power report in the excess power DB 41 in association with each other.

In step S33, the CPU 31 (the excess power acquisition unit 34 or the power request reception unit 33) generates a power supply advertisement in accordance with the excess power report stored in the excess power DB 41, and transmits the power supply advertisement through the communication circuit 38 to the power supply device 1 which can be connected to the power line 4. A power supply advertisement may include information indicating the power that can be supplied through the power line 4.

In step S34, the CPU 31 (the power request reception unit 33) determines whether a power request has been received from any power supply device 1 via the communication circuit 38. If a power request is not received, the CPU 31 ends the power supply process. On the other hand, upon receiving a power request, the CPU 31 proceeds to step S35.

In step S35, the CPU 31 (the approval/instruction unit 35) determines whether or not power can be supplied from any other power supply device 1 to the power supply device 1 that transmitted a power request. For example, the approval/instruction unit 35 compares information of the power consumption of the load 2 included in the power request with the suppliable power included in the excess power report to determine whether the power can be supplied. The suppliable power may be acquired from the excess power DB. Incidentally, comparison between the specific power consumption and the suppliable power is not essential. For example, when a power request is received from a power supply device 1, if there is another power supply device 1 that has excess power, the approval/instruction unit 35 may determine that power can be supplied. When the approval/instruction unit 35 determines that power can be supplied, the process proceeds to step S36. On the other hand, if the approval/instruction unit 35 determines that power cannot be supplied, the power supply method is ended. In this case, the approval/instruction unit 35 may transmit rejection information indicating that the power request is not approved to the power supply device 1 that has transmitted the power request.

In step S36, the CPU 31 (the approval/instruction unit 35) transmits a reception approval (supply approval) to a power supply device 1 that has transmitted a power request, and transmits a supply instruction to a power supply device 1 that can supply excess power. For example, the reception approval is transmitted to the power supply device 1*b* and the supply instruction is transmitted to the power supply device 1*a*.

In step S37, the CPU 31 (the approval/instruction unit 35) determines whether or not an end notice has been received from the power supply device 1 that has supplied the excess power. When the end notice is received through the communication circuit 38, the approval/instruction unit 35 proceeds to step S38. If the end notice has not been received, the approval/instruction unit 35 proceeds to step S39.

The CPU 31 (the approval/instruction unit 35) in step S38 transfers the end notice by the communication circuit 38 to the power supply device 1 which has received the power. Thereafter, the CPU 31 proceeds to step S41.

In step S39, the CPU 31 (the approval/instruction unit 35) determines whether or not a reception end request has been received through the communication circuit 38 from the power supply device 1 that was receiving power. Upon receiving the reception end request, the approval/instruction unit 35 proceeds to step S40. If the reception end request has not been received, the approval/instruction unit 35 returns to step S37.

In step S40, the CPU 31 (the approval/instruction unit 35) transmits the stop instruction by the communication circuit 38 to the power supply device 1 which was supplying the power.

In step S41, the CPU 31 (the billing unit 36) determines the money transfer amount to be transferred from the power supply device 1*a* to the power supply device 1*b*, and transmits a money transfer instruction to the power supply device 1*b*. The billing unit 36 receives the supply report from the power supply device 1*a* and thereby acquires the supply amount, a public key, and a virtual currency address. The billing unit 36 receives the reception report from the power supply device 1*b* and thereby acquires a reception amount and the public key. Incidentally, if the power supply device 1*a* is the only device that is to supply the power and the power supply device 1*b* is the only device that is to receive the power, the supply amount of the power supply device 1*a* will match the reception amount of the power supply device 1*b*. The billing unit 36 converts the reception amount of the power supply device 1*b* into a virtual currency, and transmits a money transfer instruction including the money transfer amount of the virtual currency and the virtual currency address of the power supply device 1*a* to the power supply device 1*b*. The power supply device 1*b* generates a money transfer request in accordance with the money transfer instruction, and transmits the money transfer request to the virtual currency NW 8.

Note that the power supply device 1*z* may also receive power from the power supply device 1*a*. in such a case, the billing unit 36 converts the reception amount of the power supply device 1*z* into a virtual currency, and transmits a money transfer instruction including the money transfer amount of the virtual currency and the virtual currency address of the power supply device 1a to the power supply device 1z. The power supply devices 1b and 1z generates a money transfer request in accordance with the money transfer instruction, and transmits the money transfer request to the virtual currency NW 8.

Here, the virtual currency money transfer from the power supply devices 1b, 1z to the power supply device 1a is executed directly, but the server 5 may relay the transfer.

FIG. 12 is a sequence diagram for illustrating a power supply method. Note that description of portions common to those in FIG. 7 and FIG. 8 is omitted.

In Sq7, the billing unit 36 of the server 5 transmits a money transfer instruction specifying the virtual currency address of the server 5 to the power supply devices 1b, 1z as the virtual currency money transfer destination.

In Sq21, the wallet management unit 61 of the power supply devices 1b, 1z generates a money transfer request to the virtual currency wallet of the server 5, and transmits the request to the virtual currency NW 8.

In Sq22, when the virtual currency NW 8 receives a money transfer request from the power supply devices 1b, 1z, the virtual currency NW 8 performs the money transfer from the virtual currency wallets of the power supply devices 1b, 1z to the virtual currency wallet of the server 5. As described above, the money transfer request includes a virtual currency address for identifying a virtual currency wallet to be a withdrawal target and the virtual currency address for identifying the virtual currency wallet to be a deposit target.

In Sq23, the billing unit 36 of the server 5 converts the power supply amount of the power supply device 1a into a virtual currency to determine the money transfer amount, generates a money transfer request including the money transfer amount, the virtual currency address of the power supply device 1a, and the self virtual currency address, and transmits the request to the virtual currency NW 8.

In Sq24, the virtual currency NW 8 receives the money transfer request by the server 5 and performs a money transfer from the virtual currency wallet of the server 5 to the virtual currency wallet of the power supply device 1a.

<Purchase Proposal>

Figure 13:
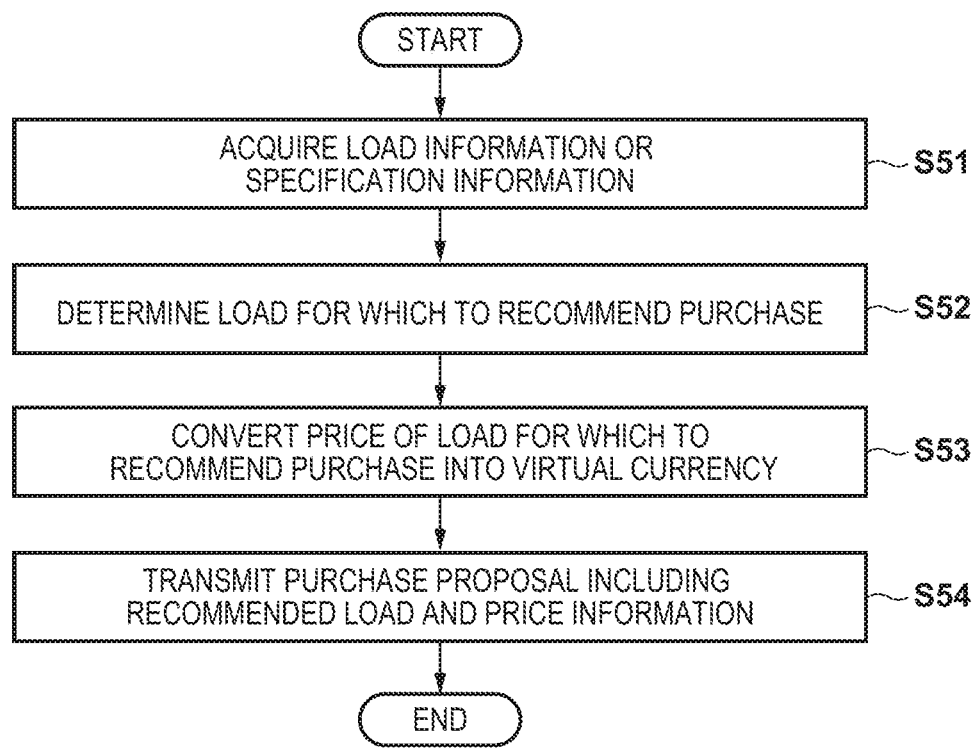
FIG. 13 is a flowchart for illustrating a method for proposing a load for which to recommend purchase.

FIG. 13 illustrates a purchase proposal method performed by the server 5.

In step S51, the purchase proposal unit 39 acquires load information or specification information collected from the power supply device 1 by the load information collection unit 37.

In step S52, the purchase proposal unit 39 determines a load for which to recommend purchase based on the load information or the specification information. For example, the purchase proposal unit 39 determines another load related to the load 2 used by the user as the load for which to recommend purchase. For example, another load that is used with the load 2 is determined as the load for which to recommend purchase. Alternatively, when the load 2 is an old model, the new model of the load 2 is determined as the load for which to recommend purchase. Here, the purchase proposal unit 39 may refer to the specification information of the power supply device 1, and narrow down the load for which to recommend purchase to only loads 2 that can be used with the power supply device 1. An upper limit on the power that can be outputted (a rated power) is defined for the power supply device 1. Therefore, in principle, only a load having a power consumption less than or equal to the rated power of the power supply device 1 can be used with the power supply device 1.

In step S53, the purchase proposal unit 39 converts the price of the load for which to recommend purchase into a virtual currency. The purchase proposal unit 39 acquires the price of the load for which to recommend purchase by using a search service on the Internet or an e-commerce site. The purchase proposal unit 39 acquires a conversion rate for conversion into virtual currency from the server of the virtual currency transaction in the virtual currency NW 8.

In step S54, the purchase proposal unit 39 generates purchase proposal information including identification information of the load for which to recommend purchase and price information thereof, and transmits the purchase proposal information to the power supply device 1.

The UI control unit 58 of the power supply device 1 displays the purchase proposal information received from the server 5 on the display device of the operation unit 17 or displays the purchase proposal information on the display device of the communication terminal 19 via the communication circuit 16. This will save the user of the power supply device 1 the effort of looking for a load that can be used with the power supply device 1.

<Summary>

According to a first aspect, there is provided a power supply system 100 having a portable first power supply device and second power supply device, each of which supplies power to a load, and a server. For example, the power supply device 1a is an example of a first power supply device. The billing unit 36 of the server 5 functions as an acquisition unit for acquiring a reception amount which is an amount of power received by the second power supply device from the first power supply device and a conversion unit for converting the reception amount into a virtual currency. The approval/instruction unit 35 and the billing unit 36 function as a money transfer instruction unit that transmits a money transfer instruction for instructing the first power supply device to perform a money transfer to the second power supply device of the virtual currency that the conversion unit converted the reception amount into.

The wallet management unit 61 of the second power supply device functions as a money transfer request unit that generates a money transfer request in order to perform a money transfer of the virtual currency to the virtual currency wallet associated with the first power supply device or the virtual currency wallet associated with the server 5 in accordance with the money transfer instruction, and transmits the money transfer request to the virtual currency network. Thus, it is possible to provide a virtual currency to the portable power supply device that has supplied the excess power.

According to a second aspect, the billing unit 36 is an acquisition unit and acquires a reception amount which is power received by the third power supply device from the first power supply device. The power supply device 1z is an example of the third power supply device. The billing unit 36, which is a conversion unit, converts the reception amount of the third power supply device into a virtual currency. The approval/instruction unit 35 and the billing unit 36, which is a money transfer instruction unit, transmit a money transfer instruction in order to instruct the third power supply device to perform a money transfer of the virtual currency converted by the conversion unit into the virtual currency wallet of the first power supply device or the wallet associated with the server.

According to a third aspect, the load information collection unit 37 of the server 5 functions as a collection unit that collects, from the first power supply device, load information indicating a load connected to the first power supply device. The purchase proposal unit 39 includes determination means for determining a load for which to recommend purchase based on the load information. The purchase proposal unit 39 includes a conversion unit that converts a price of a load for which to recommend purchase into a virtual currency. The purchase proposal unit 39 includes a generation unit that generates purchase proposal information that includes a load for which to recommend purchase and a price of the load for which to recommend purchase converted into a virtual currency. The purchase proposal unit 39 and the communication circuit 28 function as a transmission unit that transmits the purchase proposal information to the first power supply device. This saves the user the effort of searching for a load that can be used with the self power supply device 1. Further, the user can easily purchase a load with the virtual currency obtained by selling the excess power.

According to a fourth aspect, a virtual currency transfer via the server 5 is realized. As FIG. 12 illustrates, the second power supply device transmits a money transfer request to the virtual currency network in order to perform a money transfer of virtual currency to the virtual currency wallet associated with the server. The server 5 transmits a money transfer request to the virtual currency network in order to perform a money transfer of virtual currency to the virtual currency wallet associated with the first power supply device. Thus, it is possible to transfer the virtual currency, which is the compensation for the excess power from the second power supply device, through the server 5 to the first power supply device.

According to a fifth aspect, there is provided a server 5 that communicates with the portable first power supply device and second power supply device, each of which supplies power to a load. The billing unit 36 functions as an acquisition unit for acquiring a reception amount which is an amount of power received by the second power supply device from the first power supply device and a conversion unit for converting the reception amount into a virtual currency. The approval/instruction unit 35 and the billing unit 36 function as a money transfer instruction unit that transmits a money transfer instruction for instructing the first power supply device to perform a money transfer to the second power supply device of the virtual currency that the conversion unit converted the reception amount into. The money transfer instruction is an instruction for causing a second power supply device to generate a money transfer request in order to perform a money transfer of virtual currency to a virtual currency wallet associated with the first power supply device or a virtual currency wallet associated with the server, and causing the second power supply device to transmit the money transfer request to a virtual currency network.

According to a sixth aspect, the load information collection unit 37 of the server 5 functions as a collection unit that collects, from the first power supply device, load information indicating a load connected to the first power supply device. The purchase proposal unit 39 includes determination means for determining a load for which to recommend purchase based on the load information. The purchase proposal unit 39 includes a conversion unit that converts a price of a load for which to recommend purchase into a virtual currency. The purchase proposal unit 39 includes a generation unit that generates purchase proposal information that includes a load for which to recommend purchase and a price of the load for which to recommend purchase converted into a virtual currency. The purchase proposal unit 39 and the communication circuit 28 function as a transmission unit that transmits the purchase proposal information to the first power supply device. This saves the user the effort of searching for a load that can be used with the self power supply device 1. Further, the user can easily purchase a load with the virtual currency obtained by selling the excess power.

According to a seventh aspect, the engine generator 10 serves as a power generation unit. The storage battery 12 functions as a power storage unit for storing power generated by the power generation unit. The AC terminal 26a functions as a first connection unit for connecting the load. The AC terminal 26b serves as a second connection unit for connecting to a power line connected to another power supply device. The power supply circuit 11 functions as a supply unit that, in order to supply at least a portion of excess power stored in the power storage unit to another power supply device, supplies at least a portion of the excess power to a power line via the second connection unit. The UI control unit 58 and the communication circuit 16 function as a reception unit that receives deposit information indicating that the virtual currency has been deposited in the virtual currency wallet as compensation for the supply of at least part of the excess power. The operation unit 17 or the communication circuit 16 functions as an output unit for outputting deposit information.

The invention is not limited to the foregoing embodiments, and various variations/changes are possible within the spirit of the invention.

What is claimed is:

1. A power supply system, comprising:
a portable first power supply device being a portable engine-driven type generator, including a first terminal connectable to a first load, and configured to supply power to the first load;
a second power supply device including a second terminal connectable to a second load, configured to receive power from the portable engine-driven type generator and configured to supply the power to the second load; and
a server,
wherein
the server comprises:
a first processor; and
a first communication circuit connected to the first processor,
wherein the first processor is configured to:
acquire, via the first communication circuit, a reception amount which is an amount of power that the second power supply device received from the engine-driven type generator;
convert the reception amount into a virtual currency; and
transmit, to the second power supply device via the first communication circuit, a money transfer instruction in order to instruct a money transfer, to the engine-driven type generator, of the virtual currency,
and
the second power supply device comprises a second processor configured to receive the money transfer instruction from the server, and generate a money transfer request, in accordance with the money transfer instruction, and transmit the money transfer request to a virtual currency network, wherein the money transfer request causes the virtual currency network to perform a money transfer of virtual currency to a virtual currency wallet associated with the engine-driven type generator or a virtual currency wallet associated with the server.

2. The power supply system according to claim 1, wherein the first processor is further configured to:
acquires a reception amount which is a power that a third power supply device received from the first power supply device, and
converts, into a virtual currency, the reception amount of the third power supply device, and
transmit, to the third power supply device, a money transfer instruction for instructing a money transfer, to a virtual currency wallet of the first power supply device or a wallet associated with the server, of the virtual currency.

3. The power supply system according to claim 1, wherein the first processor is further configured to:
collect, from the first power supply device, load information indicating the first load connected to the first power supply device;
determine other load for which to recommend purchase based on the load information;
convert, into a virtual currency, a price of the other load for which to recommend purchase;
generate purchase proposal information that includes the other load for which to recommend purchase and the price of the load for which to recommend purchase converted into the virtual currency; and
transmit the purchase proposal information to the first power supply device.

4. A power supply system according to claim 1, wherein the second power supply device transmits to the virtual currency network a money transfer request in order to perform a money transfer of a virtual currency to a virtual currency wallet associated with the server, and
the server is configured to transmit a money transfer request to the virtual currency network in order to perform a money transfer of virtual currency to the virtual currency wallet associated with the first power supply device.

5. A server apparatus operable to communicate with a portable first power supply device being a portable engine-driven type generator, including a first terminal connectable to a first load, and configured to supply power to the first load, and a second power supply device including a second terminal connectable to a second load, configured to receive power from the portable engine-driven type generator and configured to supply the power to the second load, the server apparatus comprising:
a first processor; and
a first communication circuit connected to the first processor,
wherein the first processor is configured to:
acquire, via the first communication circuit, a reception amount which is an amount of power that the second power supply device received from the first power supply device, which is an engine-driven type generator;
convert the reception amount into a virtual currency; and
transmit, to the second power supply device, via the first communication circuit, a money transfer instruction in order to instruct a money transfer, to a virtual currency wallet associated with the engine-driven type generator or a virtual currency wallet associated with the server, of the virtual currency,
wherein
the money transfer instruction is an instruction for causing the second power supply device to generate a money transfer request in order to perform a money transfer of a virtual currency to a virtual currency wallet associated with the engine-driven type generator or a virtual currency wallet associated with the server, and for causing the second power supply device to transmit the money transfer request to a virtual currency network.

6. The server apparatus according to claim 5,
wherein the first processor is further configured to:
collect, from the first power supply device, load information indicating the first load connected to the first power supply device;
determine other load for which to recommend purchase based on the load information;
convert, into a virtual currency, a price of the other load for which to recommend purchase;
generate purchase proposal information that includes the other load for which to recommend purchase and the price of the other load for which to recommend purchase converted into the virtual currency; and
transmit the purchase proposal information to the first power supply device.

7. A portable engine-driven type generator, comprising:
a power generation unit;
a power storage unit configured to store power generated by the power generation unit;
a first connection unit configured to connect to a load;
a second connection unit configured to connect to a power line connected to another power supply device;
a supply unit configured to, in order to supply at least a portion of excess power stored in the power storage unit to the other power supply device, supply at least a portion of the excess power to a power line via the second connection unit;
a reception unit configured to receive deposit information indicating that a virtual currency has been deposited in a virtual currency wallet as compensation for supply of at least part of the excess power; and
an output unit configured to output the deposit information,
wherein the output unit comprising a display for displaying the deposit information indicating that the virtual currency has been deposited in the virtual currency wallet as compensation for supply of at least part of the excess power.

* * * * *